US008595646B2

(12) United States Patent
Kang

(10) Patent No.: US 8,595,646 B2
(45) Date of Patent: Nov. 26, 2013

(54) MOBILE TERMINAL AND METHOD OF RECEIVING INPUT IN THE MOBILE TERMINAL

(75) Inventor: Min Hun Kang, Seoul (KR)

(73) Assignee: LG Electronics Inc., Seoul (KR)

( * ) Notice: Subject to any disclaimer, the term of this patent is extended or adjusted under 35 U.S.C. 154(b) by 240 days.

(21) Appl. No.: 12/716,207

(22) Filed: Mar. 2, 2010

(65) Prior Publication Data

US 2011/0029920 A1 Feb. 3, 2011

(30) Foreign Application Priority Data

Aug. 3, 2009 (KR) ......................... 10-2009-0071170

(51) Int. Cl.
*G06F 3/048* (2013.01)
*G06F 3/041* (2006.01)

(52) U.S. Cl.
USPC .......................................... 715/810; 345/173

(58) Field of Classification Search
USPC .......................................... 715/810; 345/173
See application file for complete search history.

(56) References Cited

U.S. PATENT DOCUMENTS

| 5,825,352 | A | 10/1998 | Bisset et al. | |
|---|---|---|---|---|
| 7,812,826 | B2 * | 10/2010 | Ording et al. | 345/173 |
| 2002/0018051 | A1 * | 2/2002 | Singh | 345/173 |
| 2007/0150842 | A1 * | 6/2007 | Chaudhri et al. | 715/863 |
| 2007/0177804 | A1 | 8/2007 | Elias et al. | |
| 2007/0257891 | A1 | 11/2007 | Esenther et al. | |
| 2008/0165140 | A1 * | 7/2008 | Christie et al. | 345/173 |
| 2009/0051671 | A1 * | 2/2009 | Konstas | 345/174 |
| 2009/0061837 | A1 * | 3/2009 | Chaudhri et al. | 455/418 |
| 2009/0061841 | A1 * | 3/2009 | Chaudhri et al. | 455/420 |
| 2009/0066668 | A1 | 3/2009 | Kim et al. | |
| 2009/0085878 | A1 * | 4/2009 | Heubel et al. | 345/173 |
| 2009/0125848 | A1 | 5/2009 | Keohane et al. | |

(Continued)

FOREIGN PATENT DOCUMENTS

| CN | 201181467 | 1/2009 |
|---|---|---|
| CN | 101371258 | 2/2009 |
| CN | 101379461 | 3/2009 |
| CN | 101419526 | 4/2009 |

OTHER PUBLICATIONS

European Patent Office Application Serial No. 10160237.3, Search Report dated Jan. 7, 2013, 5 pages.

*Primary Examiner* — William Bashore
*Assistant Examiner* — Henry Orr
(74) *Attorney, Agent, or Firm* — Lee, Hong, Degerman, Kang & Waimey

(57) ABSTRACT

A mobile terminal and controlling method thereof are disclosed. The present invention includes a touchscreen and a control unit, after first and second points on the touchscreen have been simultaneously touched with a pointer, if the pointer is released from the first point while the second point keeps being touched with the pointer, the control unit controlling the release of the pointer from the first point to be recognized as a first used command, the control unit, after the first and second points on the touchscreen have been simultaneously touched with the pointer, if the pointer is released from the second point while the first point keeps being touched with the pointer, the control unit controlling the release of the pointer from the second point to be recognized as a second user command. Accordingly, although the lease number of icons for executing the diverse functions are displayed on the touchscreen, the present invention facilitates the diverse functions to be selected and executed.

21 Claims, 12 Drawing Sheets

(56) References Cited

U.S. PATENT DOCUMENTS

| | | | |
|---|---|---|---|
| 2009/0178007 A1* | 7/2009 | Matas et al. | 715/835 |
| 2009/0241072 A1* | 9/2009 | Chaudhri et al. | 715/863 |
| 2009/0284482 A1* | 11/2009 | Chin | 345/173 |
| 2009/0322673 A1* | 12/2009 | Cherradi El Fadili | 345/157 |
| 2010/0090971 A1* | 4/2010 | Choi et al. | 345/173 |
| 2010/0156818 A1* | 6/2010 | Burrough et al. | 345/173 |
| 2010/0188353 A1* | 7/2010 | Yoon et al. | 345/173 |
| 2010/0231612 A1* | 9/2010 | Chaudhri et al. | 345/684 |
| 2010/0283747 A1* | 11/2010 | Kukulski | 345/173 |
| 2010/0293460 A1* | 11/2010 | Budelli | 715/702 |
| 2010/0317332 A1* | 12/2010 | Bathiche et al. | 455/418 |

* cited by examiner

MOBILE TERMINAL AND METHOD OF RECEIVING INPUT IN THE MOBILE TERMINAL

BACKGROUND OF THE INVENTION

Pursuant to 35 U.S.C. §119(a), this application claims the benefit of earlier filing date and right of priority to Korean Application No. 10-2009-0071170, filed on Aug. 3, 2009, the contents of which are hereby incorporated by reference herein in their entirety.

1. Field of the Invention

The present invention relates to a mobile terminal, and more particularly, to a mobile terminal and controlling method thereof. Although the present invention is suitable for a wide scope of applications, it is particularly suitable for implementing a use of a terminal in further consideration of user's convenience.

2. Discussion of the Related Art

A mobile terminal is a device which may be configured to perform various functions. Examples of such functions include data and voice communications, capturing images and video via a camera, recording audio, playing music files and outputting music via a speaker system, and displaying images and video on a display. Some terminals include additional functionality which supports game playing, while other terminals are also configured as multimedia players. More recently, mobile terminals have been configured to receive broadcast and multicast signals which permit viewing of contents, such as videos and television programs.

Generally, terminals can be classified into mobile terminals and stationary terminals according to a presence or non-presence of mobility. And, the mobile terminals can be further classified into handheld terminals and vehicle mount terminals according to availability for hand-carry.

There are ongoing efforts to support and increase the functionality of mobile terminals. Such efforts include software and hardware improvements, as well as changes and improvements in the structural components which form the mobile terminal.

Recently, various kinds of touchscreen type mobile terminals introduced. A lot of icons are displayed on the touchscreen type mobile terminal to execute diverse functions, respectively. As a lot of the icons occupy considerable areas on the touchscreen, limitation is put on space utilization of the touchscreen.

SUMMARY OF THE INVENTION

Accordingly, the present invention is directed to a mobile terminal and controlling method thereof that substantially obviate one or more problems due to limitations and disadvantages of the related art.

An object of the present invention is to provide a mobile terminal and controlling method thereof, by which diverse functions executed via a minimum number of icons displayed on a screen are facilitated to be selected and executed without being displayed on a touchscreen.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a mobile terminal according to the present invention includes a touchscreen and a control unit, wherein after first and second points on the touchscreen have been simultaneously touched with a pointer, if the pointer is released from the first point while the second point keeps being touched with the pointer, the control unit controls the release of the pointer from the first point to be recognized as a first used command, and if the pointer is released from the second point while the first point keeps being touched with the pointer, the control unit controls the release of the pointer from the second point to be recognized as a second user command.

In another aspect of the present invention, a mobile terminal includes a touchscreen and a control unit, wherein when the mobile terminal is in a locked state, after first and second points on the touchscreen have been simultaneously touched with a pointer, if retouches amounting to a first prescribed count are repeatedly performed on the first point and retouches amounting to a second prescribed count are repeatedly performed on the second point, the control unit controls the mobile terminal to be released from the locked state.

In another aspect of the present invention, a method of controlling a mobile terminal includes: after first and second points on a touchscreen have been simultaneously touched with a pointer, if the pointer is released from the first point while the second point keeps being touched with the pointer, recognizing the release of the pointer from the first point as a first used command and after the first and second points on the touchscreen have been simultaneously touched with the pointer, if the pointer is released from the second point while the first point keeps being touched with the pointer, recognizing the release of the pointer from the second point to be recognized as a second user command.

In a further aspect of the present invention, a method of controlling a mobile terminal includes: enabling the mobile terminal to enter a locked state, after first and second points on the touchscreen have been simultaneously touched with a pointer, repeatedly performing retouches amounting to a first prescribed count on the first point and repeatedly performing retouches amounting to a second prescribed count on the second point and releasing the mobile terminal from the locked state.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or like parts.

As used herein, the suffixes 'module', 'unit' and 'part' are used for elements in order to facilitate the disclosure only. Therefore, significant meanings or roles are not given to the suffixes themselves and it is understood that the 'module', 'unit' and 'part' can be used together or interchangeably.

The present invention can be applicable to a various types of terminals. Examples of such terminals include mobile as well as stationary terminals, such as mobile phones, user equipment, smart phones, DTV, computers, digital broadcast terminals, personal digital assistants, portable multimedia players (PMP) and navigators.

However, by way of non-limiting example only, further description will be with regard to a mobile terminal 100, and it should be noted that such teachings may apply equally to other types of terminals.

Figure 1:
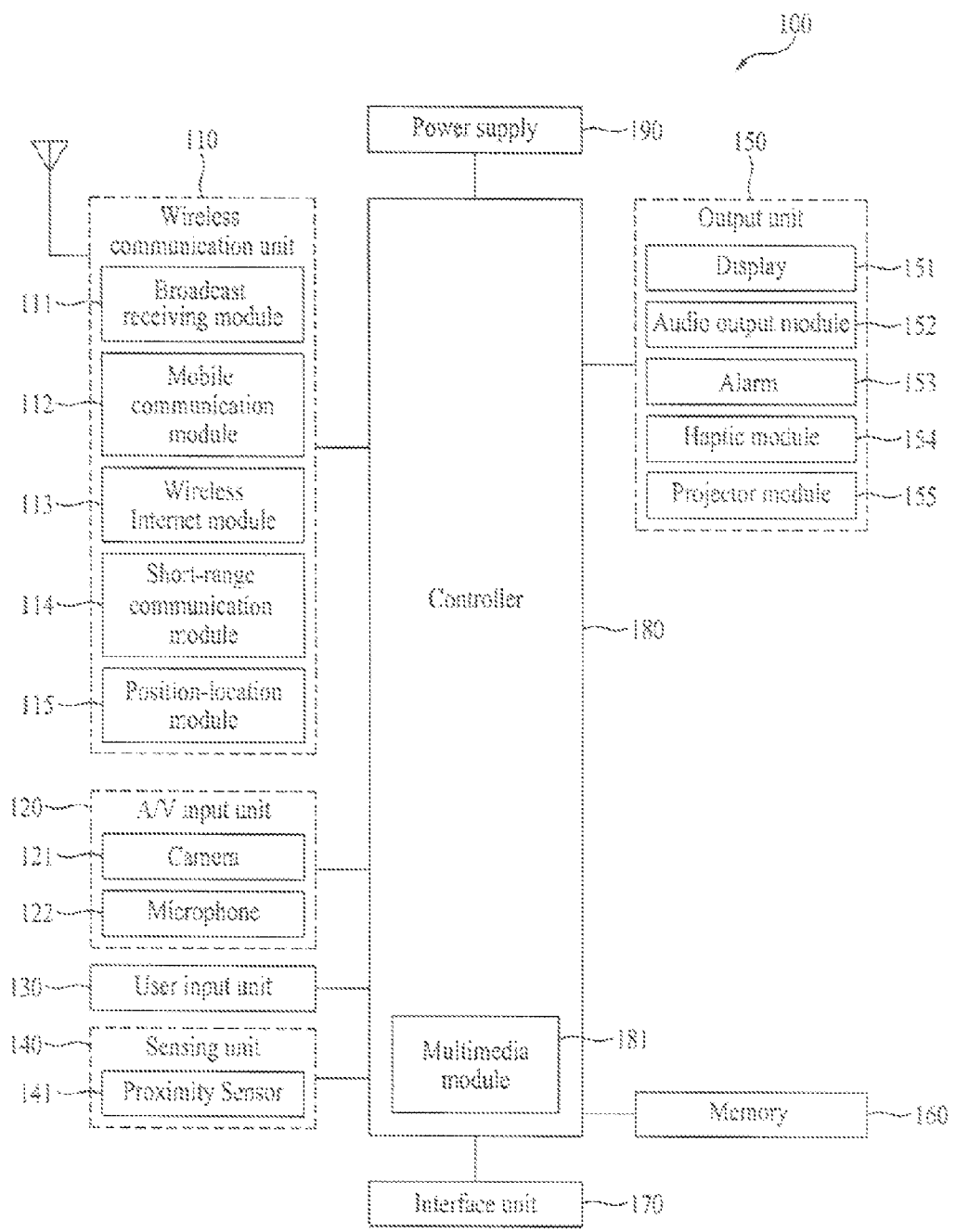
FIG. 1 is a block diagram of a mobile terminal according to one embodiment of the present invention.

FIG. 1 is a block diagram of a mobile terminal 100 in accordance with an embodiment of the present invention. FIG. 1 shows the mobile terminal 100 according to one embodiment of the present invention includes a wireless communication unit 110, an A/V (audio/video) input unit 120, a user input unit 130, a sensing unit 140, an output unit 150, a memory 160, an interface unit 170, a controller 180, a power supply unit 190 and the like. FIG. 1 shows the mobile terminal 100 having various components, but it is understood that implementing all of the illustrated components is not a requirement. Greater or fewer components may alternatively be implemented.

In the following description, the above elements of the mobile terminal 100 are explained in sequence.

First of all, the wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115 and the like.

The broadcast receiving module 111 receives a broadcast signal and/or broadcast associated information from an external broadcast managing server via a broadcast channel.

The broadcast channel may include a satellite channel and a terrestrial channel.

The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

At least two broadcast receiving modules 111 can be provided to the mobile terminal 100 in pursuit of simultaneous receptions of at least two broadcast channels or broadcast channel switching facilitation.

The broadcast associated information includes information associated with a broadcast channel, a broadcast program, a broadcast service provider, etc. And, the broadcast associated information can be provided via a mobile communication network. In this case, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), DVB-CBMS, OMA-BCAST, the data broadcasting system known as media forward link only (MediaFLO®) and integrated services digital broadcast-terrestrial (ISDB-T). Optionally, the broadcast receiving module 111 can be configured suitable for other broadcasting systems as well as the above-explained digital broadcasting systems.

The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.). Such wireless signals may represent audio, video, and data according to text/multimedia message transceivings, among others.

The wireless internet module 113 supports Internet access for the mobile terminal 100. This module may be internally or externally coupled to the mobile terminal 100. In this case, the wireless Internet technology can include WLAN (Wireless LAN) (Wi-Fi), Wibro (Wireless broadband), Wimax (World Interoperability for Microwave Access), HSDPA (High Speed Downlink Packet Access), etc.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-location module 115 identifies or otherwise obtains the location of the mobile terminal 100. If desired, this module may be implemented with a global positioning system (GPS) module.

Referring to FIG. 1, the audio/video (A/V) input unit 120 is configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. And, the processed image frames can be displayed on the display 151.

The image frames processed by the camera 121 can be stored in the memory 160 or can be externally transmitted via the wireless communication unit 110. Optionally, at least two cameras 121 can be provided to the mobile terminal 100 according to environment of usage.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 in case of a call mode. The microphone 122 typically includes assorted noise removing algorithms to remove noise generated in the course of receiving the external audio signal.

The user input unit 130 generates input data responsive to user manipulation of an associated input device or devices. Examples of such devices include a keypad, a dome switch, a touchpad (e.g., static pressure/capacitance), a jog wheel, a jog switch, etc.

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100. As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. And, the sensing unit 140 can include a proximity sensor 141.

The output unit 150 generates outputs relevant to the senses of sight, hearing, touch and the like. And, the output unit 150 includes the display 151, an audio output module 152, an alarm unit 153, a haptic module 154, a projector module 155 and the like.

The display 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display 151 may additionally or alternatively display images which are associated with these modes, the UI or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmittive type, which can be named a transparent display. As a representative example for the transparent display, there is TOLED (transparent OLED) or the like. A rear configuration of the display 151 can be implemented in the optical transmittive type as well. In this configuration, a user is able to see an object in rear of a terminal body via the area occupied by the display 151 of the terminal body.

At least two displays 151 can be provided to the mobile terminal 100 in accordance with the implemented configuration of the mobile terminal 100. For instance, a plurality of displays can be arranged on a single face of the mobile terminal 100 in a manner of being spaced apart from each other or being built in one body. Alternatively, a plurality of displays can be arranged on different faces of the mobile terminal 100.

In case that the display 151 and a sensor for detecting a touch action (hereinafter called 'touch sensor') configures a mutual layer structure (hereinafter called 'touchscreen'), it is able to use the display 151 as an input device as well as an output device. In this case, the touch sensor can be configured as a touch film, a touch sheet, a touchpad or the like.

The touch sensor can be configured to convert a pressure applied to a specific portion of the display 151 or a variation of a capacitance generated from a specific portion of the display 151 to an electric input signal. Moreover, it is able to configure the touch sensor to detect a pressure of a touch as well as a touched position or size.

If a touch input is made to the touch sensor, signal(s) corresponding to the touch is transferred to a touch controller. The touch controller processes the signal(s) and then transfers the processed signal(s) to the controller 180. Therefore, the controller 180 is able to know whether a prescribed portion of the display 151 is touched.

Referring to FIG. 1, a proximity sensor (not shown in the drawing) can be provided to an internal area of the mobile terminal 100 enclosed by the touchscreen or around the touchscreen. The proximity sensor is the sensor that detects a presence or non-presence of an object approaching a prescribed detecting surface or an object existing around the proximity sensor using an electromagnetic field strength or infrared ray without mechanical contact. Hence, the proximity sensor has durability longer than that of a contact type sensor and also has utility wider than that of the contact type sensor.

The proximity sensor can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. In case that the touchscreen includes the electrostatic capacity proximity sensor, it is configured to detect the proximity of a pointer using a variation of electric field according to the proximity of the pointer. In this case, the touchscreen (touch sensor) can be classified as the proximity sensor.

In the following description, for clarity, an action that a pointer approaches without contacting with the touchscreen to be recognized as located on the touchscreen is named 'proximity touch'. And, an action that a pointer actually touches the touchscreen is named 'contact touch'. The meaning of the position on the touchscreen proximity-touched by the pointer means the position of the pointer which vertically opposes the touchscreen when the pointer performs the proximity touch.

The proximity sensor detects a proximity touch and a proximity touch pattern (e.g., a proximity touch distance, a proximity touch duration, a proximity touch position, a proximity touch shift state, etc.). And, information corresponding to the detected proximity touch action and the detected proximity touch pattern can be outputted to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event. The alarm unit 153 is able to output a signal for announcing the event occurrence by way of vibration as well as video or audio signal. The video or audio signal can be outputted via the display 151 or the audio output unit 152. Hence, the display 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be outputted in a manner of being synthesized together or can be outputted in sequence.

The haptic module 154 is able to generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The projector module 155 is the element for performing an image projector function using the mobile terminal 100. And, the projector module 155 is able to display an image, which is identical to or partially different at least from the image displayed on the display 151, on an external screen or wall according to a control signal of the controller 180.

In particular, the projector module 155 can include a light source (not shown in the drawing) generating light (e.g., laser) for projecting an image externally, an image producing means (not shown in the drawing) for producing an image to output externally using the light generated from the light source, and a lens (not shown in the drawing) for enlarging to output the image externally in a predetermined focus distance. And, the projector module 155 can further include a device (not shown in the drawing) for adjusting an image projected direction by mechanically moving the lens or the whole module.

The projector module 155 can be classified into a CRT (cathode ray tube) module, an LCD (liquid crystal display) module, a DLP (digital light processing) module or the like according to a device type of a display means. In particular, the DLP module is operated by the mechanism of enabling the light generated from the light source to reflect on a DMD (digital micro-mirror device) chip and can be advantageous for the downsizing of the projector module 151.

Preferably, the projector module 155 can be provided in a length direction of a lateral, front or backside direction of the mobile terminal 100. And, it is understood that the projector module 155 can be provided to any portion of the mobile terminal 100 according to the necessity thereof.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures, moving pictures, etc. And, a recent use history or a cumulative use frequency of each data (e.g., use frequency for each phonebook, each message or each multimedia) can be stored in the memory unit 160. Moreover, data for various patterns of vibration and/or sound outputted in case of a touch input to the touchscreen can be stored in the memory unit 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. And, the mobile terminal 100 is able to operate in association with a web storage for performing a storage function of the memory 160 on Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include User Identify Module (UIM), Subscriber Identify Module (SIM), Universal Subscriber Identity Module (USIM) and/or the like. A device having the identity module (hereinafter called 'identity device') can be manufactured as a smart card. Therefore, the identity device is connectible to the mobile terminal 100 via the corresponding port.

When the mobile terminal 110 is connected to an external cradle, the interface unit 170 becomes a passage for supplying the mobile terminal 100 with a power from the cradle or a passage for delivering various command signals inputted from the cradle by a user to the mobile terminal 100. Each of the various command signals inputted from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component.

Moreover, the controller 180 is able to perform a pattern recognizing process for recognizing a writing input and a picture drawing input carried out on the touchscreen as characters or images, respectively.

The power supply unit 190 provides power required by the various components for the mobile terminal 100. The power may be internal power, external power, or combinations thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

Figure 2A:
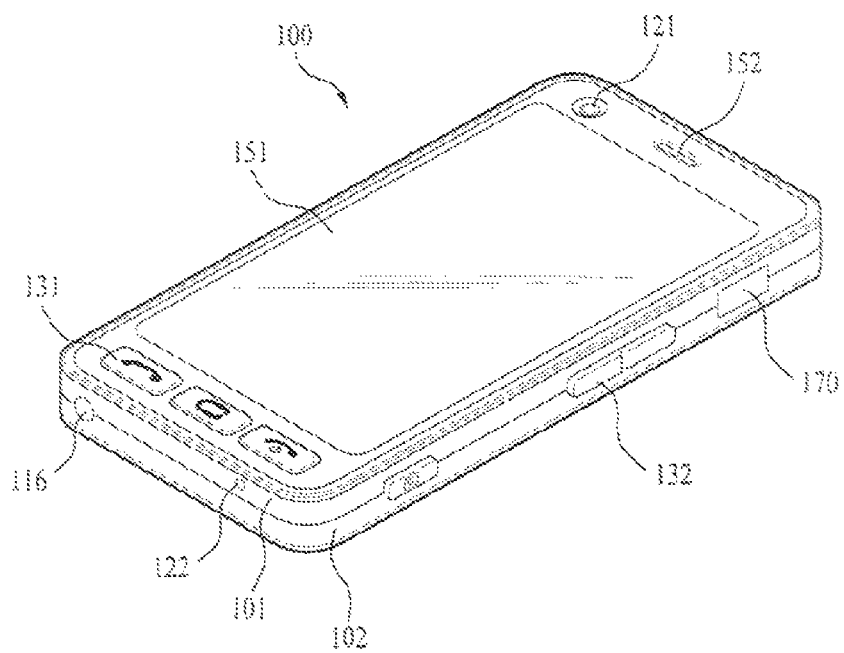
FIG. 2A is a front perspective diagram of a mobile terminal according to one embodiment of the present invention.

FIG. 2A is a front perspective diagram of a mobile terminal according to one embodiment of the present invention.

The mobile terminal 100 shown in the drawing has a bar type terminal body. Yet, the mobile terminal 100 may be implemented in a variety of different configurations. Examples of such configurations include folder-type, slide-type, rotational-type, swing-type and combinations thereof. For clarity, further disclosure will primarily relate to a bar-type mobile terminal 100. However such teachings apply equally to other types of mobile terminals.

Referring to FIG. 2A, the mobile terminal 100 includes a case (casing, housing, cover, etc.) configuring an exterior thereof. In the present embodiment, the case can be divided into a front case 101 and a rear case 102. Various electric/electronic parts are loaded in a space provided between the front and rear cases 101 and 102. Optionally, at least one middle case can be further provided between the front and rear cases 101 and 102 in addition.

The cases 101 and 102 are formed by injection molding of synthetic resin or can be formed of metal substance such as stainless steel (STS), titanium (Ti) or the like for example.

A display 151, an audio output unit 152, a camera 121, user input units 130/131 and 132, a microphone 122, an interface 180 and the like can be provided to the terminal body, and more particularly, to the front case 101.

The display 151 occupies most of a main face of the front case 101. The audio output unit 151 and the camera 121 are provided to an area adjacent to one of both end portions of the display 151, while the user input unit 131 and the microphone 122 are provided to another area adjacent to the other end portion of the display 151. The user input unit 132 and the interface 170 can be provided to lateral sides of the front and rear cases 101 and 102.

The input unit 130 is manipulated to receive a command for controlling an operation of the terminal 100. And, the input unit 130 is able to include a plurality of manipulating units 131 and 132. The manipulating units 131 and 132 can be named a manipulating portion and may adopt any mechanism of a tactile manner that enables a user to perform a manipulation action by experiencing a tactile feeling.

Content inputted by the first or second manipulating unit 131 or 132 can be diversely set. For instance, such a command as start, end, scroll and the like is inputted to the first manipulating unit 131. And, a command for a volume adjustment of sound outputted from the audio output unit 152, a command for a switching to a touch recognizing mode of the display 151 or the like can be inputted to the second manipulating unit 132.

Figure 2B:
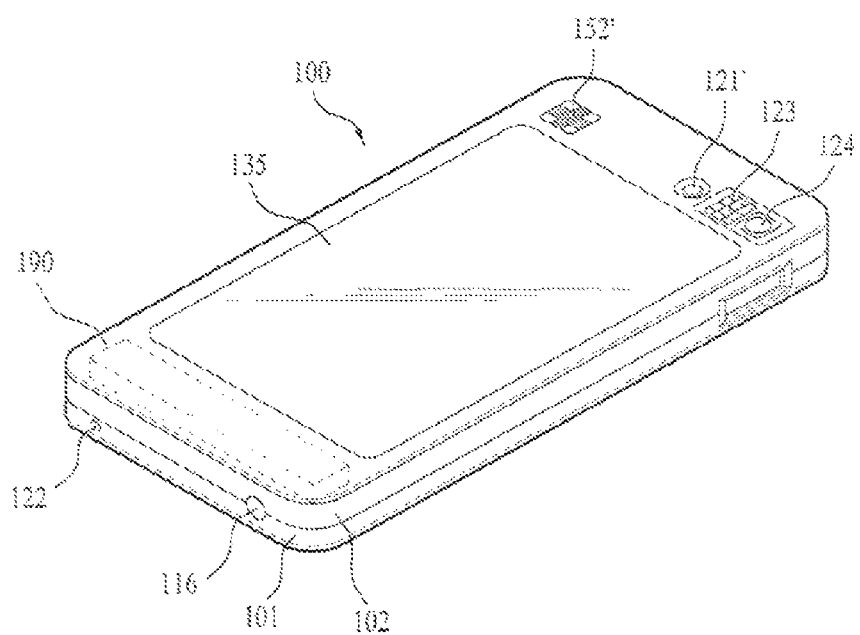
FIG. 2B is a rear perspective diagram of a mobile terminal according to one embodiment of the present invention.

FIG. 2B is a perspective diagram of a backside of the terminal shown in FIG. 2A.

Referring to FIG. 2B, a camera 121' can be additionally provided to a backside of the terminal body, and more particularly, to the rear case 102. The camera 121' has a photographing direction that is substantially opposite to that of the former camera 121 shown in FIG. 21A and may have pixels differing from those of the former camera 121.

Preferably, for instance, the former camera 121 has low pixels enough to capture and transmit a picture of user's face for a video call, while the latter camera 121' has high pixels for capturing a general subject for photography without transmitting the captured subject. And, each of the cameras 121 and 121' can be installed at the terminal body to be rotated or popped up.

A flash 123 and a mirror 124 are additionally provided adjacent to the camera 121'. The flash 123 projects light toward a subject in case of photographing the subject using the camera 121'. In case that a user attempts to take a picture of the user (self-photography) using the camera 121', the mirror 124 enables the user to view user's face reflected by the mirror 124.

An additional audio output unit 152' can be provided to the backside of the terminal body. The additional audio output unit 152' is able to implement a stereo function together with the former audio output unit 152 shown in FIG. 2A and may be used for implementation of a speakerphone mode in talking over the terminal.

A broadcast signal receiving antenna can be additionally provided to the lateral side of the terminal body as well as an antenna for communication or the like. The antenna 124 constructing a portion of the broadcast receiving module 111 shown in FIG. 1 can be retractably provided to the terminal body.

A power supply unit 190 for supplying a power to the terminal 100 is provided to the terminal body. And, the power supply unit 190 can be configured to be built within the terminal body. Alternatively, the power supply unit 190 can be configured to be detachably connected to the terminal body.

A touchpad 135 for detecting a touch can be additionally provided to the rear case 102. The touchpad 135 can be configured in a light transmittive type like the display 151. In this case, if the display 151 is configured to output visual information from both of its faces, it is able to recognize the visual information via the touchpad 135 as well. The information outputted from both of the faces can be entirely controlled by the touchpad 135. Alternatively, a display is further provided to the touchpad 135 so that a touchscreen can be provided to the rear case 102 as well.

The touchpad 135 is activated by interconnecting with the display 151 of the front case 101. The touchpad 135 can be provided at the rear of the display 151 and in parallel with the display 151. The touchpad 135 can have a size equal to or smaller than that of the display 151.

In the following description, embodiments related to a controlling method applicable to the above-configured mobile terminal are explained with reference to the accompanying drawings.

In the following description of the embodiments, assume that the display module 151 includes a touchscreen. If the display module 151 includes the touchscreen, it is able to further facilitate the implementations of the following embodiments. In the following description, a display screen of the touchscreen 151 shall be indicated by a reference number 400.

Figure 3:
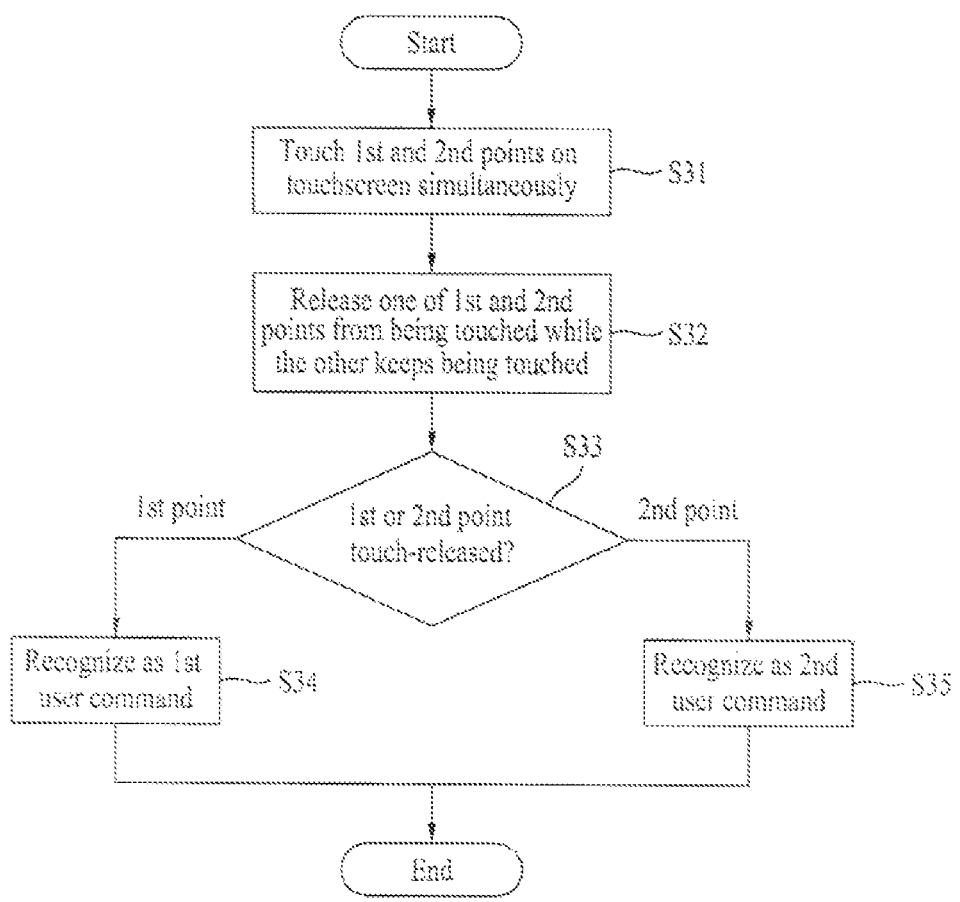
FIG. 3 is a flowchart for a method of controlling a mobile terminal according to one embodiment of the present invention.

FIG. 3 is a flowchart for a method of controlling a mobile terminal according to one embodiment of the present invention, and FIGS. 4 to 10 are diagrams for configurations of display screens on which a method of controlling a mobile terminal according to one embodiment of the present invention is implemented.

Figure 4:
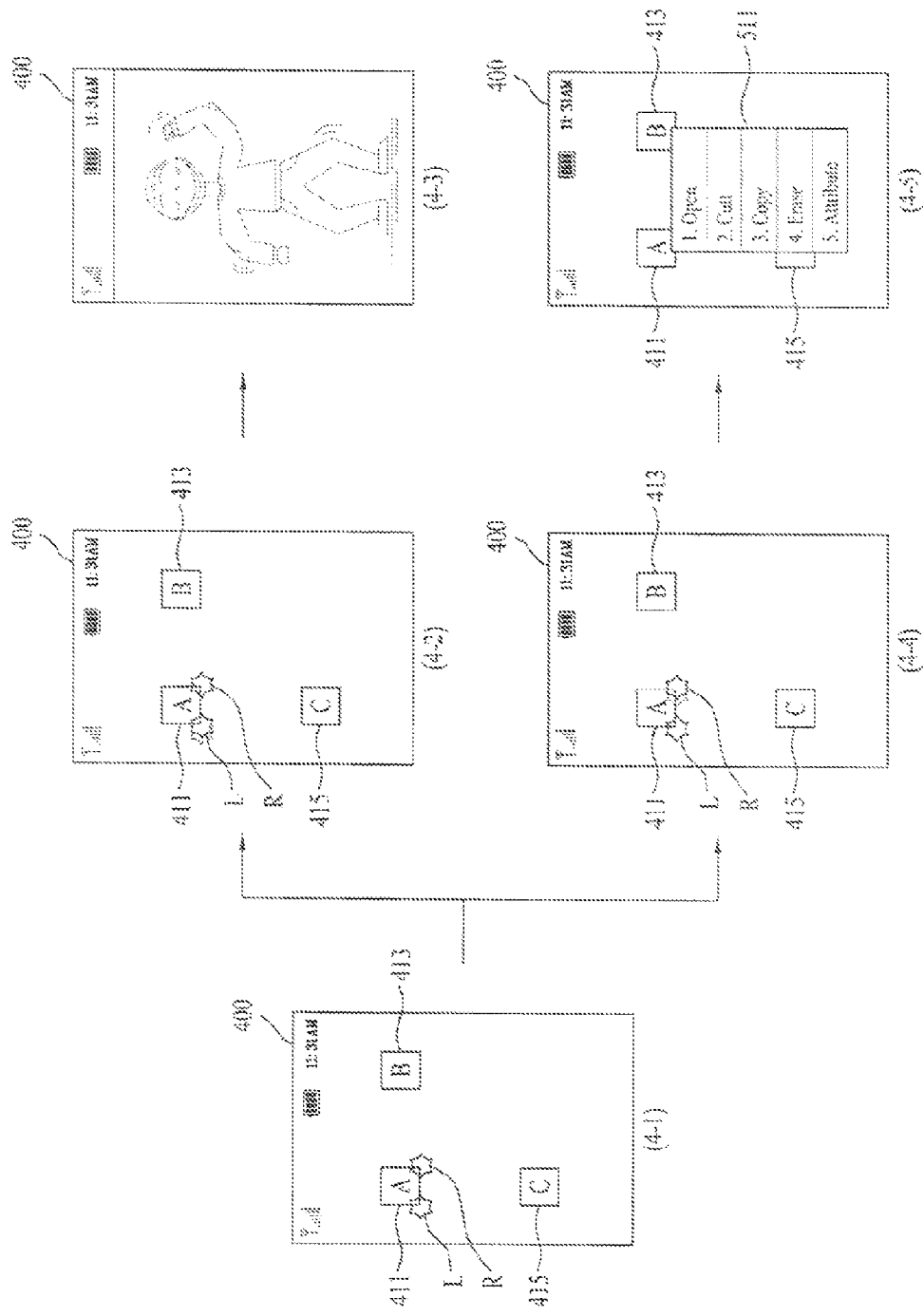
FIGS. 4 to 10 are diagrams for configurations of display screens on which a method of controlling a mobile terminal according to one embodiment of the present invention is implemented.

Referring to (4-1) of FIG. 4, a plurality of objects 411, 413 and 415 are displayed on the touchscreen 400. The objects include icons of various kinds of files (text, moving image, still image, music, etc.), menu icons, indicators, widgets, and windows. In the following description, assume that the object is an icon for the image file (hereinafter "image icon").

First of all, a pair of points for one 411 of a plurality of the objects 411, 413 and 415, i.e., a first point L and a second point R are simultaneously touched with a pointer such as fingers [S31]. For clarity and convenience of the following description, assume that the first and second points L and R are located at left and right sides of the touchscreen 400 or positioned horizontally to each other. Yet, it is not mandatory for the first and second points to be located at the left and right sides horizontally. Alternatively, the first and second points can be replaced by each other or can be vertically located.

Referring to (4-2) and (4-4) of FIG. 4, while one of the first point L and the second point R keeps being touched, a touch gesture can be performed on the other point in a manner that the corresponding point is released from the touch and then re-touched with the pointer [S32].

In this case, the controller 180 can recognize the touch gesture as a user command differing according to whether either the first point L or the second point R is touch-released and then retouched.

Therefore, when the touch gesture is performed, the controller 180 determines whether either the first point L or the second point R is touch-released and then retouched [S33].

As a result of the determination, referring to (4-2) of FIG. 4, if it is determined that the first point L is touch-released and then retouched, the controller 180 recognize it as a first user command and then executes a function according to the first used command [S34].

Referring to (4-3) of FIG. 4, the first user command can include a command for executing the image icon to enable a corresponding image to be displayed on the touchscreen 400, by which the first user command is non-limited.

As a result of the determination, referring to (4-4) of FIG. 4, if it is determined that the second point R is touch-released and then retouched, the controller 180 recognizes it as a second user command and then executes a function according to the second user command [S35].

Referring to (4-5) of FIG. 4, the second user command can include a command for executing the image icon to enable a menu list 511 for the image icon to be displayed on the touchscreen 400, by which the first user command is non-limited.

In the above description, if the pointer located at one of the first and second points L and R is touch-released and then retouched, the first/second user command is executed. Alternatively, it is understood that the first/second user command can be directly executed as soon as the pointer is touch-released from one of the first and second points L and R.

In the following description, for clarity and convenience of explanation, touch gestures are defined in the following manner. First of all, after first and second points L and R have been simultaneously touched with a pointer, if the first point L is touch-released or retouched after the touch-release while the second point R keeps being touched, this touch gesture is named 'first touch gesture'. Secondly, after first and second points L and R have been simultaneously touched with a pointer, if the second point R is touch-released or retouched after the touch-release while the first point L keeps being touched, this touch gesture is named 'second touch gesture'.

According to a menu executed in the mobile terminal 10, it is able to utilize the first and second gestures in various ways. This is explained with further reference to FIGS. 5 to 10 as follows.

Figure 5:
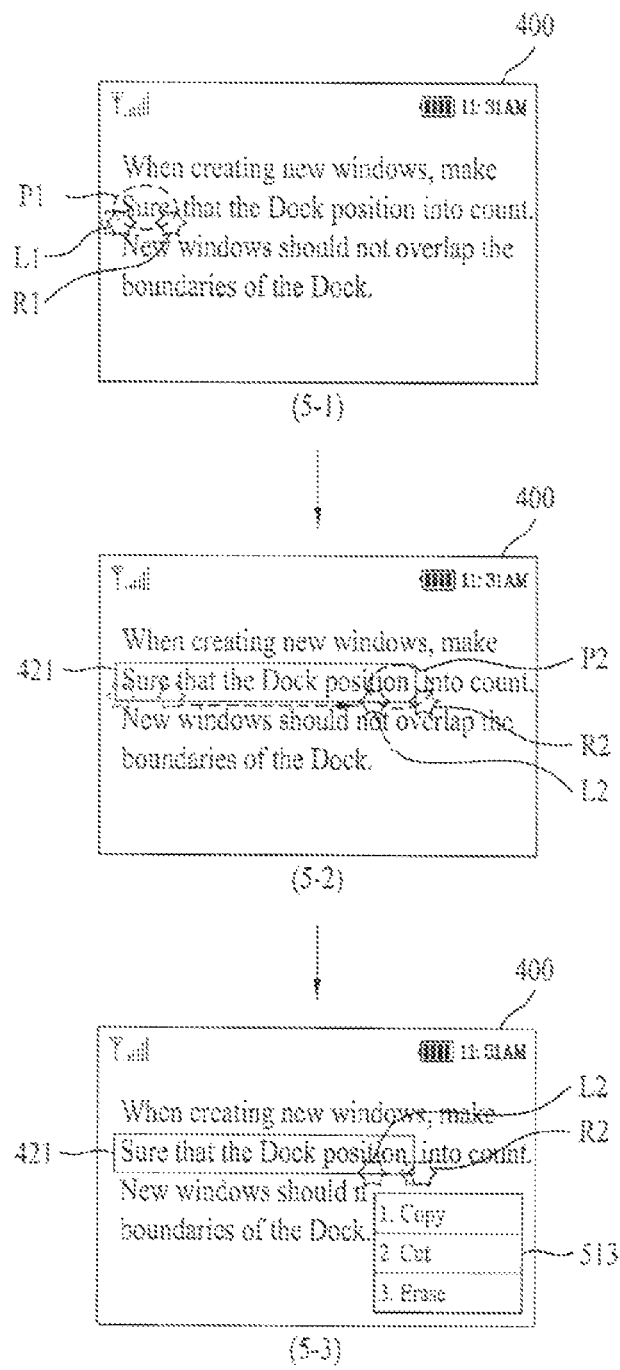

First of all, FIG. 5 is explained. In FIG. 5, assume that a menu for a text viewer or editor (e.g., a text read or write relevant menu, a message read or write relevant menu, etc.) is being executed.

Referring to (5-1) of FIG. 5, a text is being displayed on the touchscreen 400. A first touch gesture is performed on a first specific point P1 with a pointer.

After the first touch gesture has been performed, referring to (5-2) of FIG. 5, while both a first point L1 and a second point R1 keep being touched, the pointer is dragged to a second specific point P2.

If so, a block 421 extending from a first specific point P1 to the second specific point P2 is formed.

Subsequently, referring to (5-3) of FIG. 5, a second touch gesture is performed on the second specific point. A menu list 513 for the block is then displayed on the touchscreen 400.

In brief, FIG. 5 exemplarily illustrates the following process. First of all, when a block for a text is formed, a first touch gesture is recognized as a command for inputting a start point of the block. It is then able to recognize a second touch gesture as a command for inputting an end point of the block and displaying a menu list for the block.

In FIG. 5, it is exemplarily shown that a block is formed for a text, by which the present embodiment is non-limited. Therefore, a block can be formed for an image as well. This is explained with further reference to FIG. 6 as follows.

Figure 6:
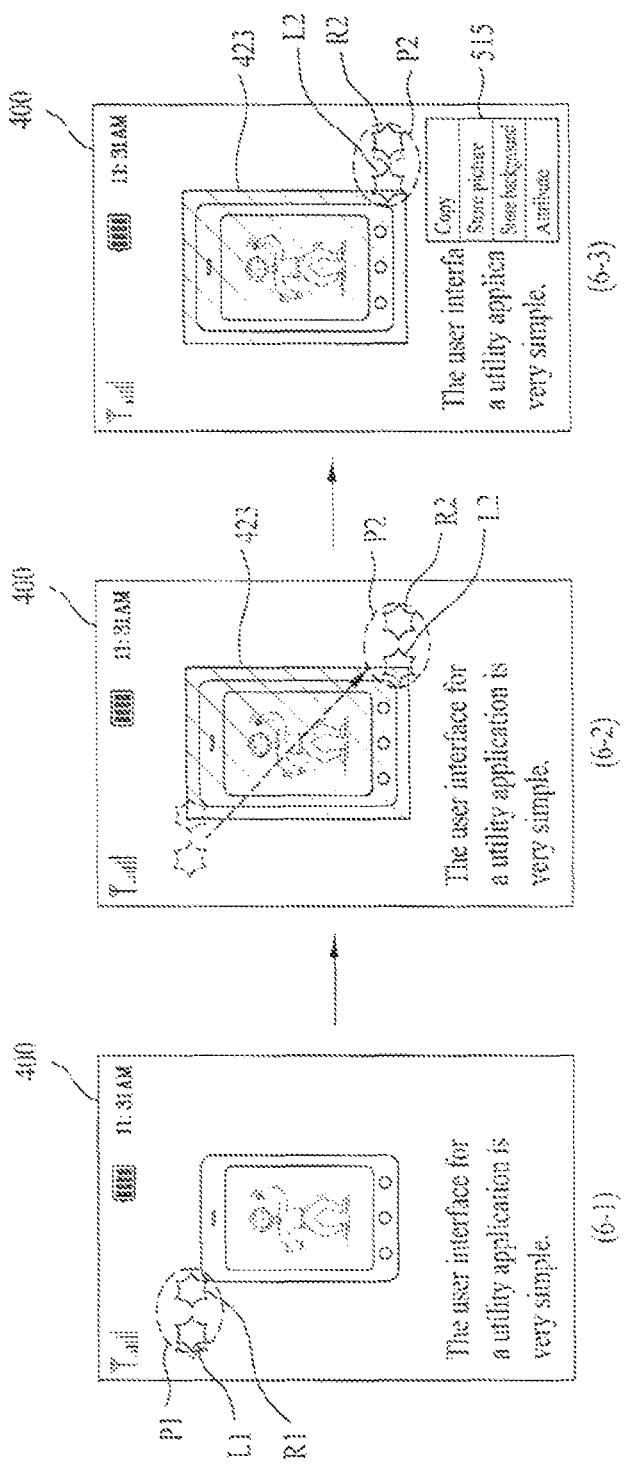

Referring to (6-1) of FIG. 6, an image is being displayed on the touchscreen 400. In the drawing, exemplarily shown is that the image is displayed together with another text, by which the present embodiment is non-limited. Therefore, it is able to display the image only.

Subsequently, a first touch gesture is performed on a first specific point P1 using a pointer.

After the first touch gesture has been performed, referring to (6-2) of FIG. 6, while a first point L1 and a second point R1 keep being touched, the pointer is dragged to a second specific point P2.

If so, a diagonal type block 423, in which a straight line extending from the first specific point P1 to the second specific point P2 is set to a diagonal line, is formed.

Subsequently, referring to (6-3) of FIG. 6, a second touch gesture is performed on the second specific point P2. A menu list 515 for the block is then displayed on the touchscreen 400.

In brief, FIG. 6 exemplarily illustrates the following process. First of all, when a block for an image is formed, a first touch gesture is recognized as a command for inputting a start point of a diagonal line of the rectangular block. It is then able to recognize a second touch gesture as a command for inputting an end point of the diagonal line of the rectangular block and displaying a menu list for the block.

Figure 7:
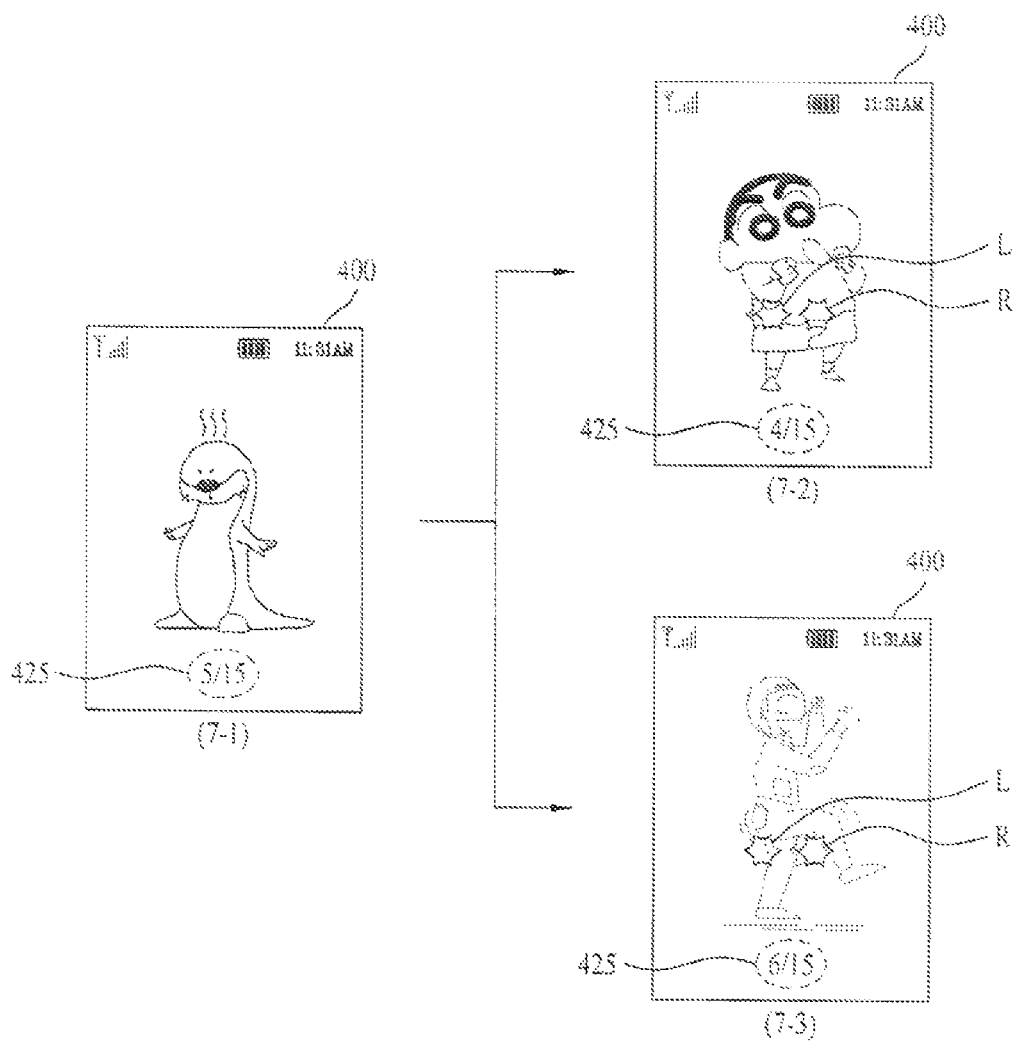

FIG. 7 is described as follows.

Referring to (7-1) of FIG. 7, a multimedia content having a prescribed execution sequence is being displayed on the touchscreen 400.

For example, the multimedia content having the prescribed execution sequence can include a still picture file content such as a photo album preset to be displayed in prescribed order, a video or music file content preset to be displayed in prescribed order, a webpage or e-book content preset to move to a previous or next page in prescribed order, a broadcast content preset to switch to a previous or next channel in prescribed order, or the like.

For clarity and convenience of the following description, assume that the displayed multimedia content includes a photo album. In particular, one picture in the photo album is being displayed on the touchscreen 400. And, it is able to display an indicator 425, which indicates that a fifth picture of total 15 pictures in the photo album is being displayed, on the touchscreen 400. Optionally, the indicator 425 can be displayed or not if necessary.

Subsequently, referring to (7-2) of FIG. 7, a first touch gesture is performed on the touchscreen 400. If so, a picture (i.e., a fourth picture) previous to the former picture (i.e., the fifth picture) shown in (7-1) of FIG. 7 can be displayed on the touchscreen 400.

While the fifth picture, as shown in (7-1) of FIG. 7, is being displayed, a second touch gesture, as shown in (7-3) of FIG. 7, is performed on the touchscreen 400. If so, a picture (i.e., a sixth picture) next to the former picture (i.e., the fifth picture) shown in (7-1) of FIG. 7 can be displayed on the touchscreen 400.

In brief, FIG. 7 exemplarily illustrates the following process. First of all, when a multimedia content having the above-explained execution sequence is being executed in the mobile terminal 100, the controller 180 recognizes a first touch gesture as a command for executing the multimedia content in a previous execution sequence and also recognizes a second touch gesture as a command for executing the multimedia content in a next execution sequence.

Figure 8:
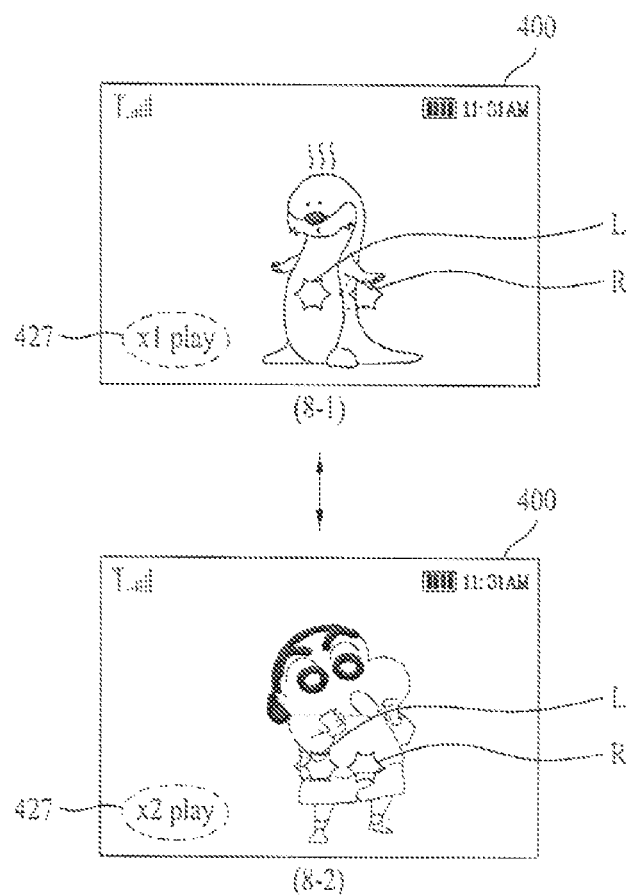

FIG. 8 is described as follows.

Referring to (8-1) of FIG. 8, a video content (or a music content) is being played in the mobile terminal 100. And, an indicator 427, which indicates that the video is being played back at a normal speed (e.g., 1×), is being displayed on the touchscreen 400. Optionally, the indicator 427 can be displayed or not if necessary.

Subsequently, a first touch gesture is performed on the touchscreen 400.

If so, referring to (8-2) of FIG. 8, the video content is displayed at high speed (e.g., 2×) on the touchscreen 400. Besides, if the first touch gesture is performed again on the touchscreen 400, the video content can be displayed at higher speed (e.g., 4×) [not shown in the drawing].

While the video, as shown in (8-2) of FIG. 8, is being displayed at the high speed, a second touch gesture is performed on the touchscreen 400.

If so, referring to (8-1) of FIG. 8, the video content is displayed at the normal speed (e.g., 1×) on the touchscreen 400. Besides, if the second touch gesture is performed again on the touchscreen 400, the video content can be displayed at lower speed (e.g., 0.5×) or reverse speed (e.g., −1×) [not shown in the drawing].

In FIG. 8, exemplarily shown is that the play speed of the video content is adjusted if the first or second touch gesture is performed, by which the present embodiment is non-limited. When the first or second touch gesture is performed, it is able to adjust a play timing point of the video content in a total playtime. This is apparent to those having ordinary skill in the art based on the above-mentioned description.

Figure 9:
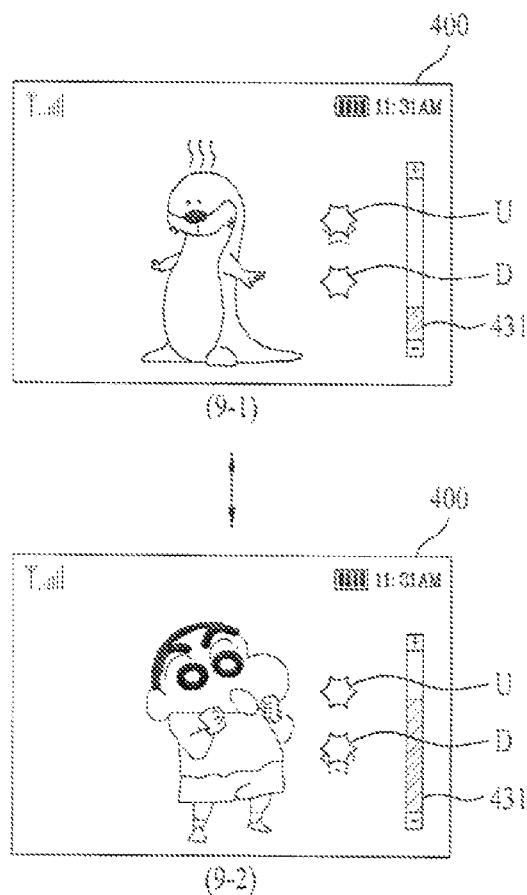

In the above description, when the first point L and the second point R are simultaneously touched with the pointer for the first or second touch gesture, whether the first and second points are parallel or perpendicular to each other is not taken into account. If whether the first and second points are parallel or perpendicular to each other is taken into account, it is able to input more user commands to the mobile terminal 100 using the touch gestures of the above-mentioned styles. This is explained in detail with further reference to FIG. 9. In FIG. 9, assume that first and second points simultaneously touched with the pointer are horizontally arranged in the above-mentioned first or second touch gesture.

Referring to (9-1) of FIG. 9, a multimedia content is being played on the touchscreen 400. In this case, the multimedia content can include a video content, a music content, a broadcast content or the like.

A volume indicator 431 is being displayed on the touchscreen 400. Yet, the volume indicator 431 is optionally displayable if necessary.

Besides, if first or second touch gesture is performed on the touchscreen 400, it is able to adjust a play speed or timing point of the multimedia content or switch a broadcast channel of the multimedia content [not shown in the drawing]. Details of this mechanism are explained in the foregoing description and shall be omitted for clarity of this disclosure.

While the multimedia content is being played, after third and fourth points U and D, which are vertically located, have been simultaneously touched with the pointer, the third point U is touch-released or retouched after the touch release by keeping the fourth point D being touched with the pointer. This shall be is named 'third touch gesture'.

In FIG. 9, exemplarily shown is that the third point is located above the fourth point, by which the present embodiment is non-limited. And, it is understood that the third point can be located below the fourth point.

Referring to (9-2) of FIG. 9, a volume of the multimedia content played in the mobile terminal 100 can be raised.

While the multimedia content is being played, after third and fourth points U and D, which are vertically located, have been simultaneously touched with the pointer, the fourth point D is touch-released or retouched after the touch release by keeping the third point U being touched with the pointer. This shall be is named 'fourth touch gesture'.

If the fourth touch gesture is performed, a volume of the multimedia content played in the mobile terminal 100 can be lowered.

In the above description, the volume is raised if the third touch gesture is performed. The volume is lowered if the fourth touch gesture is performed. This non-limits the present embodiment. For instance, it is able to configure a brightness of a screen to be increased if the third touch gesture is performed. And, it is able to configure a brightness of a screen to be decreased if the fourth touch gesture is performed.

Figure 10:
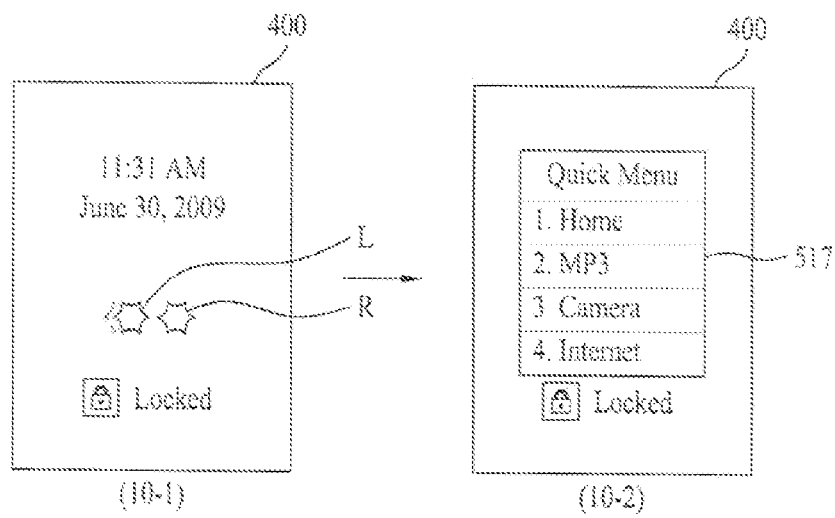

FIG. 10 is described as follows.

First of all, the mobile terminal 100 can enter a locked state. In (10-1) of FIG. 10, exemplarily shown is that an image according to the locked state is displayed on the touchscreen 400.

One of the first to fourth touch gestures is performed on the touchscreen 400.

If so, referring to (10-2) of FIG. 10, a list 517 of menus executable despite the locked state of the mobile terminal 100 is displayed on the touchscreen 400. For instance, one of the menus included in the list 517 can be executed by being touched.

In the above description, if one of the first to fourth gestures is performed, the list of menus executable in the locked state of the mobile terminal is displayed. This non-limits the present embodiment. For instance, if one of the first to fourth gestures is performed, it is able to configure the locked state from being canceled in the mobile terminal.

In the following description, controlling methods implemented in the mobile terminal according to embodiments of the present invention are explained with reference to FIG. 11 and FIG. 12.

Figure 11:
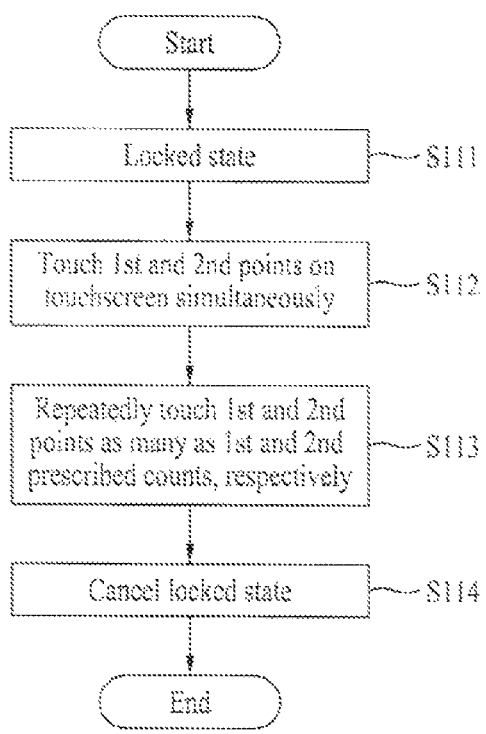
FIG. 11 is a flowchart for a method of controlling a mobile terminal according to another embodiment of the present invention.
Figure 12:
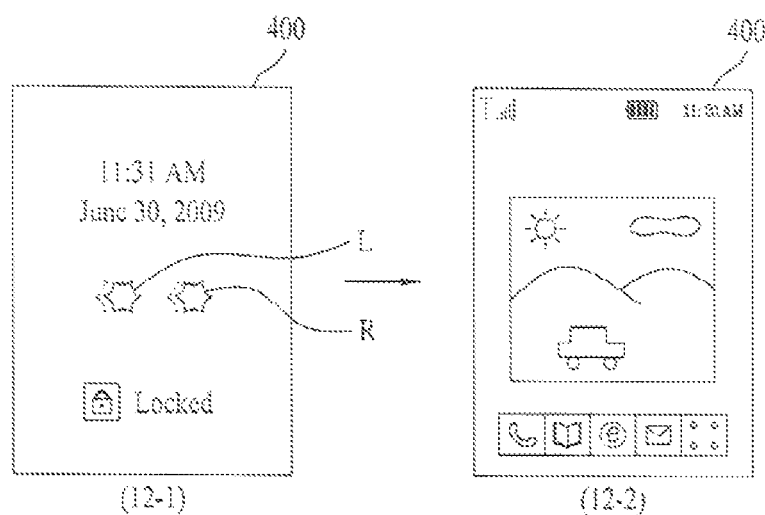
FIG. 12 is a diagram for configurations of a display screen on which a method of controlling a mobile terminal according to one embodiment of the present invention is implemented.

FIG. 11 is a flowchart for a method of controlling a mobile terminal according to another embodiment of the present invention, and FIG. 12 is a diagram for configurations of a display screen on which a method of controlling a mobile terminal according to one embodiment of the present invention is implemented.

First of all, the mobile terminal 100 can enter a locked state. In (12-1) of FIG. 12, two point on the touchscreen 400, i.e., a first point L and a second point R are simultaneously touched with such a pointer as fingers. For clarity and convenience of the following description, as mentioned in the foregoing description, assume that the first and second points L and R are located horizontally at left and right sides on the touchscreen 400, respectively. Yet, it is not mandatory for the first and second points to be located at the left and right sides horizontally. Alternatively, as mentioned in the foregoing description, the first and second points can be replaced by each other or can be vertically located.

Retouches amounting to a first prescribed count and a second prescribed count are performed on the first point and the second point, respectively. For instance, after the touch has been released from the first point, the second point keeps being touched until the retouches to the first point are completed. After the touch has been released from the second point, the first point keeps being touched until the retouches to the second point are completed. In this case, the first prescribed count may be equal to or different from the second prescribed count.

At least one or more retouches to the first point (hereinafter named 'first retouch') and at least one or more retouches to the second point (hereinafter named 'second retouch') are alternately performed according to a preset pattern.

For instance, assume that the first prescribed count and the second prescribed count are set to 5 and 3, respectively.

If so, the preset pattern can include 'two first retouches→one second touch→one first retouch→two second retouches→two first retouches' for example.

Alternatively, the preset pattern can include 'three second retouches→five first retouches'.

If so, referring to (12-1) of FIG. 12, the mobile terminal 100 is released from the locked state.

Accordingly, the present invention provides the following effects and/or advantages.

First of all, although the least number of icons for executing the diverse functions are displayed on the touchscreen, the present invention facilitates the diverse functions to be selected and executed.

It will be apparent to those skilled in the art that various modifications and variations can be specified into other forms without departing from the spirit or scope of the inventions.

For instance, it is able to configure the touch gesture to be set for a function icon for executing a main menu of the mobile terminal only.

In addition, the above-described methods can be implemented in a program recorded medium as computer-readable codes. The computer-readable media include all kinds of recording devices in which data readable by a computer system are stored. The computer-readable media include ROM, RAM, CD-ROM, magnetic tapes, floppy discs, optical data storage devices, and the like for example and also include carrier-wave type implementations (e.g., transmission via Internet). And, the computer can include the controller 180 of the terminal.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal, comprising:
   a touchscreen configured to receive touch inputs for entering commands; and
   a controller configured to:
      detect whether a touch input received by the touchscreen is a first command or a second command, wherein a touch input for the first command includes substantially simultaneously touching a first point on the touchscreen and a second point on the touchscreen and removing the touch from the touchscreen at the first point while maintaining the touch on the second point on the touchscreen, and wherein a touch input for the second command including substantially simultaneously touching the first point on the touchscreen and the second point on the touchscreen and removing the touch from the touchscreen at the second point while maintaining the touch on the first point on the touchscreen;
      perform a first operation corresponding to the first command when the touch at the first point is removed from the touchscreen while maintaining the touch on the second point on the touchscreen; and
      perform a second operation corresponding to the second command and different from the first operation when the touch input at the second point is removed from the touchscreen while maintaining the touch on the first point on the touchscreen.

2. The mobile terminal of claim 1, wherein:
   the touch input for the first command further comprises retouching the first point on the touchscreen after the removal of the touch from the touchscreen at the first point, and
   the touch input for the second command further comprises retouching the second point on the touchscreen after the removal of the touch from the touchscreen at the second point.

3. The mobile terminal of claim 2, wherein:
   the touch input for the first command further comprises maintaining the touch at the second point on the touchscreen until the first point on the touchscreen is retouched, and the touch input for the second command further comprises maintaining the touch at the first point on the touchscreen until the second point on the touchscreen is retouched.

4. The mobile terminal of claim 1, wherein:
the first point and the second point on the touchscreen each correspond to an object displayed on the touchscreen,
the first operation includes executing a function of the object, and
the second operation includes displaying a menu is of the object.

5. The mobile terminal of claim 1, wherein:
the touch input for the first command inputs a start point for a block outline, and
the touch input for the second command inputs an end point of the block outline.

6. The mobile terminal of claim 1, wherein:
the touch input for the first command or the touch input for the second command is a second touch input; and
the touchscreen is configured to receive a first touch input comprising substantially simultaneously touching a first point on the touchscreen and a second point on the touchscreen to define a start point for a block outline and dragging the touches along the touch screen to an end point of the block outline.

7. The mobile terminal of claim 5, wherein the controller is further configured to cause a menu list for the block outline to be displayed when the touch input for the second command is received.

8. The mobile terminal of claim 5, wherein the block outline captures text of at least a portion of a message displayed on the touchscreen.

9. The mobile terminal of claim 5, wherein the block outline captures at least a portion of an image displayed on the touchscreen.

10. The mobile terminal of claim 1, wherein when a current item of multimedia content having an execution sequence is displayed on the touchscreen, the first command is a command to display the multimedia content of the previous item in relation to the current item in the sequence of the multimedia content and the second command is a command to display the multimedia content of the next item in relation to the current item in the sequence of the multimedia content.

11. The mobile terminal of claim 10, wherein the multimedia content comprises a webpage, an e-book, a moving picture, a photo album, music or a broadcast.

12. The mobile terminal of claim 1, wherein when the mobile terminal plays music or a moving picture, the first operation is a fast-forward operation and the second operation is a rewind operation.

13. The mobile terminal of claim 1, wherein the first point on the touchscreen and the second point on the touchscreen are positioned substantially horizontal to each other.

14. The mobile terminal of claim 1, wherein:
the first point on the touchscreen and the second point on the touchscreen are positioned substantially vertical to each other; and
the controller is further configured to:
detect whether the touch input received by the touchscreen is a third command or a fourth command, a touch input for the third command including substantially simultaneously touching the first point on the touchscreen and the second point on the touchscreen and removing the touch from the touchscreen at the first point while maintaining the touch at the second point on the touchscreen, and a touch input for the fourth command including substantially simultaneously touching the first point on the touchscreen and the second point on the touchscreen and removing the touch from the touchscreen at the second point while maintaining the touch at the first point on the touchscreen;
perform a third operation corresponding to third command when the touch input at the first point is removed from the touchscreen while maintaining the touch on the second point on the touchscreen, and
perform a fourth operation corresponding to the fourth command when the touch input at the second point is removed from the touchscreen while maintaining the touch on the first point on the touchscreen.

15. The mobile terminal of claim 14, wherein:
the touch input for the third command further comprises retouching the first point on the touchscreen after the removal of the touch from the touchscreen at the first point, and
the touch input for the fourth command further comprises retouching the second point on the touchscreen after the removal of the touch from the touchscreen at the second point.

16. The mobile terminal of claim 15, wherein:
the touch input for the third command further comprises maintaining the touch of the second point on the touchscreen until the first point on the touchscreen is retouched, and
the touch input for the fourth command further comprises maintaining the touch of the first point on the touchscreen until the second point on the touchscreen is retouched.

17. The mobile terminal of claim 14, wherein:
the third operation includes increasing volume of sound produced, and
the fourth operation includes decreasing the volume of the sound produced.

18. The mobile terminal of claim 1, wherein the first operation or the second operation includes releasing the mobile terminal from a locked state when the mobile terminal is in the locked state.

19. The mobile terminal of claim 1, wherein the first operation or the second operation includes displaying a list of menus that are executable in a locked state when the mobile terminal is in the locked state.

20. The mobile terminal of claim 1, wherein:
the controller is further configured to determine a relation of position of the first point on the touchscreen and the second point on the touchscreen when the first point on the touch screen and the second point on the touchscreen are substantially simultaneously touched; and
the relation of position of the first point on the touchscreen and the second point on the touchscreen is maintained until the performing of the first operation or the second operation.

21. A method of controlling a mobile terminal, the mobile terminal comprising a touchscreen for receiving touch inputs for entering commands and a controller for detecting whether a touch input received by the touchscreen is a first command or a second command, the method comprising:
substantially simultaneously receiving a touch at a first point on the touchscreen and a second point on the touchscreen;
recognizing removal of the touch from the touchscreen at the first point while maintaining the touch of the second point on the touchscreen as a first command;
recognizing a removal of the touch from the touchscreen at the second point while recognizing a maintaining of the touch of the first point on the touchscreen as a second command;

performing a first operation corresponding to the first command when the touch at the first point is removed from the touchscreen while maintaining the touch on the second point on the touchscreen; and performing a second operation corresponding to the second command and different from the first operation when the touch input at the second point is removed from the touchscreen while maintaining the touch on the first point on the touchscreen.

* * * * *